United States Patent [19]
Love et al.

[11] Patent Number: 6,058,107
[45] Date of Patent: May 2, 2000

[54] METHOD FOR UPDATING FORWARD POWER CONTROL IN A COMMUNICATION SYSTEM

[75] Inventors: Robert T. Love, Barrington; Chad Bohlmann, Oak Park; Michael J. Bach, Kildeer; William R. Bayer, Palatine, all of Ill.

[73] Assignee: Motorola, Inc., Schuamburg, Ill.

[21] Appl. No.: 09/057,166

[22] Filed: Apr. 8, 1998

[51] Int. Cl.[7] .................................................. H04J 3/14
[52] U.S. Cl. ...................... 370/332; 370/252; 370/335; 370/342; 455/522
[58] Field of Search ..................................... 370/252, 320, 370/332, 333, 335, 340, 342, 347; 455/442, 504, 524, 522, 13.4, 38.3

[56] References Cited

U.S. PATENT DOCUMENTS

| | | | |
|---|---|---|---|
| 5,396,516 | 3/1995 | Padovani et al. | 370/342 |
| 5,604,730 | 2/1997 | Tiedemann, Jr. | 370/335 |
| 5,872,775 | 2/1999 | Saints et al. | 370/342 |
| 5,893,035 | 4/1999 | Chen | 455/442 |

*Primary Examiner*—Douglas W. Olms
*Assistant Examiner*—Shick Hom
*Attorney, Agent, or Firm*—John B. MacIntyre; Mario J. Donato, Jr.

[57] ABSTRACT

A method for updating power control at a base transceiver station in a communication system is provided. A base transceiver station transmits a signal frame. A mobile station receives the signal frame. The mobile station determines whether the signal frame was accurately received and sets a metric bit in a quality metric. The metric bit indicates whether the signal frame was received correctly by the mobile station. The mobile station transmits the quality metric, which is received by the base transceiver station. It is then determined whether to update power control, the determination based at least in part upon the quality metric.

35 Claims, 8 Drawing Sheets

6,058,107

METHOD FOR UPDATING FORWARD POWER CONTROL IN A COMMUNICATION SYSTEM

FIELD OF THE INVENTION

The present invention relates generally to communication systems, and more particularly to a method for updating forward power control in a communication system.

BACKGROUND OF THE INVENTION

Communication systems, such as Code Division Multiple Access (CDMA) systems, communicate messages between infrastructure equipment and mobile units. As used herein, a forward message refers to a message generated by cellular infrastructure equipment and transmitted for reception by a mobile communication unit, and a reverse message refers to a message generated by a mobile communication unit, such as a mobile cellular phone.

Power control is an important function in most communication systems and is essential to the proper operation of second generation (2G) and third generation (3G) cellular systems employing DS-CDMA. Power control is used to maintain sufficient communication link quality and information throughput while using minimum power levels to maximum system capacity. Changing the power levels of the forward communication links used by a base transceiver station (BTS) to transmit information to mobile stations is referred to as forward power control. Changing the power levels of the reverse communication links used by the mobile station to transmit information to serving BTSs is referred to as reverse power control.

Forward power control for second generation CDMA systems, such as IS-95 or J-ANSI-STD008 systems, typically use forward link quality information feedback transmitted on reverse links to update forward link power levels. This feedback information can be in the form of a bit used to indicate whether an individual forward link traffic channel (TCH) frame was erased. One such example is an erasure indicator bit (EIB) used in J-ANSI-STD008 systems. Another such example is a message to indicate some number of forward link frames were erased in a given time period, such as Power Measurement Report Message (PMRM) used in IS-95 or J-ANSI-STD008 systems.

Forward power control for third generation CDMA systems, such as proposed for CDMAOne, UMTS, and ARIB systems, typically use gain update information fed back on reverse links every 1.25 milliseconds or less and is referred to as fast forward power control. This feedback information can be punctured or sent on reverse link control channels.

As used herein, the term punctured refers to power control information bits replacing information bits in reverse link traffic channel frames. The gain update information is typically determined at the mobile station by comparing a measured signal-to-interference ratio to a signal-to-interference threshold determined by forward link quality. At the serving BTSs, the gain update information is used to decide whether to increase or decrease forward link gains resulting in a increase or decrease link forward link transmitted power.

In a typical CDMA system, when entering the boundary region between base transceiver stations, a mobile station transitions from communicating with one base transceiver station to communicating with both base transceiver stations simultaneously. Thus, the communication is not interrupted and the speech quality is not degraded, even temporarily. This multiple link communication is commonly referred to as soft-handoff. Significant diversity benefit is derived by the mobile station due to the receiving and combining of multiple signal paths from the serving base stations during soft-handoff, thereby allowing a net drop in forward link power. Soft-handoff can involve two or more BTSs.

For 3G systems utilizing fast forward power control involving soft-handoff, it is necessary to correct the forward TCH or forward link gains used at each BTS to account for gain update errors that occur over the reverse link channels. Typically while in soft-handoff, one or more of the reverse links will have a very high erasure rate or exhibit qualities that inhibit detection of the power control information, such as gain updates, for prolonged periods of time. As used herein, erasure rate refers to the percentage of frames received by a mobile unit from a BTS that are received with detectable bit or symbol errors, or that fail forward error detection/correction, or those frames whose transmission rate cannot be determined.

A 3G system employing fast forward power control corrects for high erasure rates on weaker reverse links relative to the dominant reverse link by employing a post-selection forward power control function. The post-selection forward power control function computes a new gain level based on information corresponding to the reverse link with the best quality as determined by the post-selection function. A new gain level is periodically sent to each serving BTS to update and synchronize the TCH gains.

One problem associated with such a post-selection gain correction method is when all reverse links indicate a high gain update error rate based on either all frames containing the gain update information being erased or all reverse link channels carrying the gain update information indicating a high error rate. In this case, if the power control update information transmitted every 1.25 milliseconds is used, it is possible to incorrectly power up or power down the forward links to the mobile station.

Spuriously powering up can create excess interference in the system. Powering down the BTS can degrade voice quality or cause a dropped call, depending on the duration of the reverse link outage. This problem can be especially severe in 3G systems because of the use of high power, high data rate supplemental forward link channels used along with a lower rate lower power fundamental channels. Typically the power control information corresponds to the fundamental channel.

Second generations systems similarly solve the poor reverse feedback link problem during soft-handoff by obtaining the forward link quality information, such as erasure indicator bits (EIBs) or Power Measurement Report Messages (PMRMs), used for forward power control from the best quality reverse link determined by the post-selection function. As used herein, the term dominant reverse leg refers to the link with the fewest reverse link frame erasures or whose frames have the lowest bit or symbol error rate or best decoder quality metric over a given time period.

In addition to poor coverage, the reverse links may also be all bad when a mobile station turns off its transmitter on the reception of a predetermined number of forward link bad frames. This method is employed in IS-95A, IS-95B and J-ANSI-STD008, where the predetermined number of forward link bad frames is set to twelve.

Consequently, a need exists for a method for performing forward power control when the feedback links are temporarily missing or the power control information received on the feedback links cannot be determined.

DETAILED DESCRIPTION OF A PREFERRED EMBODIMENT

The present invention provides a method for updating power control at a base transceiver station when the feedback link is temporarily missing or the power control information received on the feedback link cannot be determined. The base transceiver station transmits a signal frame. The signal frame may contain any combination of speech information, video information, or data to be sent over the air (OTA). A mobile station receives the signal frame. The mobile station determines whether the signal frame was accurately received and sets a metric bit in a quality metric. The metric bit indicates whether the signal frame was received correctly by the mobile station. The mobile station transmits the quality metric, which is received by the base transceiver station. It is then determined whether to update power control. The determination of whether to update the power control of the base transceiver station is based at least in part upon the quality metric.

Figure 1:
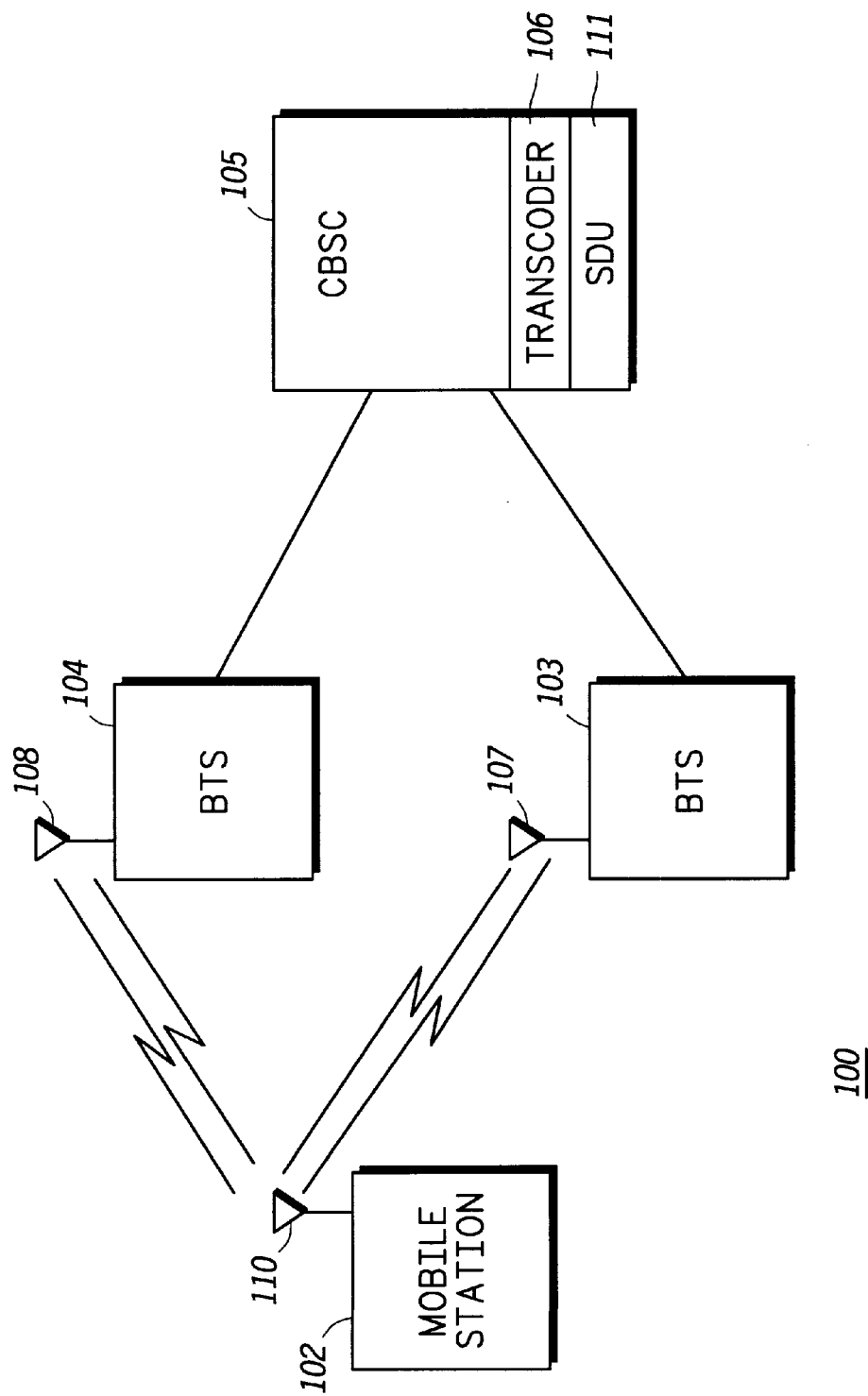
FIG. 1 depicts a communication system in accordance with the preferred embodiment of the present invention.

The present invention can be better understood with reference to FIGS. 1–8. FIG. 1 depicts a communication system 100 in accordance with the preferred embodiment of the present invention. System 100 includes a mobile station 102, a first base transceiver station 104, a second base transceiver station 103, and a Centralized Base Station Controller (CBSC) 105. CBSC 105 includes a transcoder 106, and a selection distribution unit 111. System 100 preferably includes a plurality of mobile stations and base transceiver stations, but only one mobile station and two base transceiver stations are depicted in FIG. 1 for clarity. In a preferred embodiment, system 100 is a Code Division Multiple Access (CDMA) system. System 100 may also be any communication system that transmits signaling messages and requires accurate delivery and receipt by mobile stations.

Base stations 103 and 104 are preferably a "MOTOROLA SC9600" base transceiver station. First base station 104 includes a transceiver 108 that includes a transmitter and a receiver. Second base station 103 includes a transceiver 107 that includes a transmitter and a receiver. Transceivers 107 and 108 transmit, over-the-air, RF signals to be received by mobile unit 102. The transmission is well-known in the art, and will not be described further in this application. Signals transmitted from base stations 103 and 104 to mobile unit 102 are referred to herein as forward traffic frames, or as forward link messages. Transceivers 107 and 108 receive messages from mobile unit 102, as is well known in the art. Such messages are referred to herein as reverse link messages.

Mobile unit 102 is preferably a cellular telephone unit that is capable of communicating with base transceiver stations 103 and 104. In a preferred embodiment, mobile unit 102 is a digital cellular CDMA telephone. Mobile unit 102 may also be a wireless data terminal or a videophone. Mobile unit 102 includes a transceiver 110 that includes a transmitter and a receiver, as is well-known in the art. Mobile unit 102 communicates with base stations 103 and 104 by transmitting messages by the transceiver 110 located therein on a reverse link, and by receiving messages generated by base stations 103 and 104 at transceiver 110 located therein on the forward link.

CBSC 105 is preferably a "MOTOROLA SUPERCELL CBSC". In the preferred embodiment of the present invention, BTSs 103 and 104 act as the central location for managing power control in system 100. In an alternate embodiment of the present invention, CBSC 105 manages power control in system 100.

Figure 2:
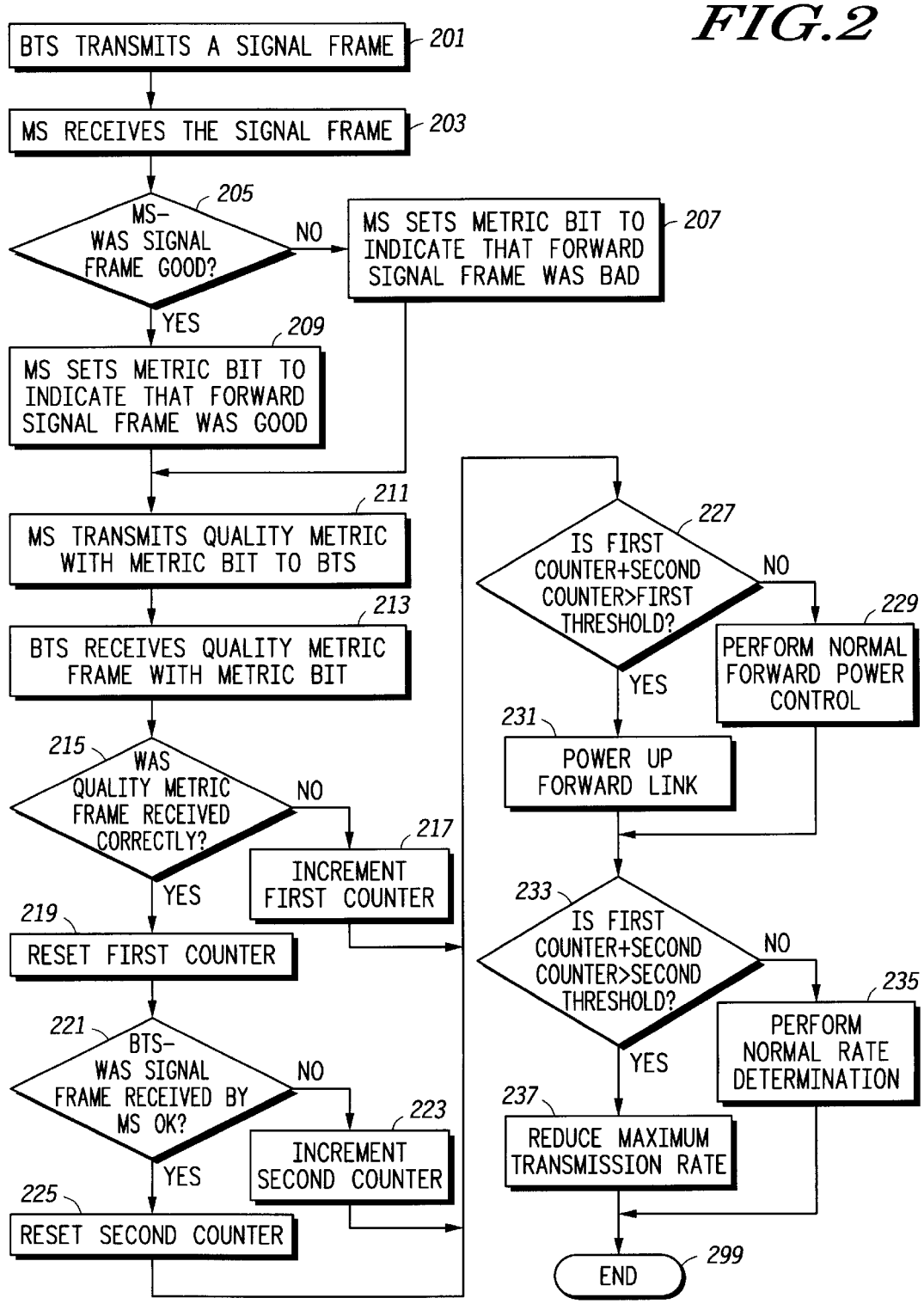
FIG. 2 depicts a flow diagram for updating forward power control when having one forward link in accordance with the preferred embodiment of the present invention.

FIG. 2 depicts a flow diagram for updating forward power control in system 100. In the preferred embodiment described in FIG. 2, a CBSC approach is utilized wherein the CBSC performs the processing. In an alternate embodiment, a transcoder within the CBSC performs the processing. In a further alternate embodiment, a mixed approach is utilized wherein the CBSC performs some of the processing and the transcoder performs other of the processing steps.

Referring now to the preferred embodiment, the base transceiver station transmits (201) a signal frame. The signal frame may contain any combination of speech information, video information, or data to be sent over the air (OTA). The mobile station receives (203) the signal frame transmitted by the BTS. The mobile station then determines (205) whether the signal received was good. A signal frame is considered good if it is received with few bit or symbol errors. A signal frame is also considered good if the frame passes forward error detection/correction. In either case the transmission rate can be determined. More specifically, a frame is considered good or received correctly if its computed CRC matches the transmitted CRC and its transmission rate can be determined, otherwise the frame is considered bad, erased, or received incorrectly.

If the signal received was not good, the mobile station sets (207) a metric bit to indicate that the forward frame received from the BTS was not properly received. The signal received is considered not good, or bad, if the signal was not received correctly. If the signal received by the mobile station was good, the mobile station sets (209) the metric bit to indicate that the forward frame from the BTS was properly received by the mobile station.

After setting the metric bit, the mobile station transmits (211) a reverse link OTA frame containing the metric bit to the BTS. The BTS receives (213) the metric bit from the mobile station. The BTS then determines (215) whether the frame that includes the metric bit was received correctly by the BTS from the mobile station. If the frame was not received correctly, the BTS will increment (217) a first counter. If the reverse link frame was not received correctly, the BTS will reset (219) the first counter. In the preferred embodiment, the BTS resets the first counter upon receiving a metric bit frame correctly because the system only adjusts forward power control when a predetermined number of successive frames have been improperly received. This alleviates the problems associated with receiving just a single bad frame, or a number of bad frames that are below the first threshold value.

The BTS then determines (221) whether the forward signal frame was received correctly by the mobile station. If the forward signal frame was not received correctly, the BTS will increment (223) a second counter. If the forward signal frame was received correctly by the mobile station, the BTS will reset (225) the second counter.

The first counter indicates how long the feedback information from the mobile station has been unavailable. The second counter indicates how long it has been since the mobile has received a good forward link frame from the BTS. In the preferred embodiment the sum of the first and second counter is utilized by comparing with a first threshold. Alternately, one or both counters can be compared to the threshold. Once the first threshold has been exceeded, the BTS will power up the forward link transmissions by a predetermined amount to try to achieve a higher delivery rate of forward link messages.

In the preferred embodiment of the present invention, the first threshold is set to ten. Although the threshold may be set to any desired value, it is preferred to set the first threshold to a value between about 2 and 20. This value is selected to minimize the time the forward link is bad so as to avoid missing critical messaging needed to perform soft handoff, reduce the period of bad voice quality, and in some cases to cause a mobile station to turn on, or key, its transmitter if it has dekeyed it upon receiving a predetermined number of bad frames.

For IS-95A/J-ANSI-STD008 systems, a value of 10 has been found to be high enough that short problems with the forward signal do not lead to an unnecessary increase in transmit power of forward link signals, while not being too low to provide for dropped calls or other problems with communications or signal quality. If the power level is increased too quickly or to an excessive level, excess interference can be introduced into the system. This excess noise may lead to other signaling problems, which should be avoided.

The BTS then determines (227) whether the sum of the first counter and the second counter exceeds the first threshold. If the sum of the two counters does not exceed the first threshold, the BTS performs (229) normal forward power control. In the preferred embodiment, normal forward power control is characterized by reducing the forward gain by step-down units every delta time frames until a metric bit, such as an EIB bit in J-ANSI-STD008, or message, such as PMRM in IS-95, is received at the BTS that indicates that a predetermined number of frames were erased at the mobile station.

If a predetermined number of frames have been erased, the forward gain will be increased by a step-up amount. In an alternate embodiment, forward power control information is received in a predetermined number of time frames on a reverse link channel. This causes an increase or a decrease in the forward link gains by a certain number of units.

If the sum of the first counter and the second counter exceeds the first threshold, the BTS powers up (231) the forward link by a predetermined number of units. In the preferred embodiment, the forward link digital voltage gain is increased by the gain increase amount used in normal forward link power control.

The BTS then determines (233) if the sum of the first counter and the second counter exceeds a second threshold. The second threshold is larger than the first threshold and it indicates failure to improve the forward link. That is, if the counter sum reaches this value then the forward links being at the maximum gain level alone cannot fix the forward link hence the maximum transmission rate must be also reduced to improve the likelihood of a frame being correctly received. In the preferred embodiment the threshold would be set to 20 and fall in the range of 3 to 30.

If the sum of the first and second counters does not exceed the second threshold, the BTS performs (235) normal rate determination. Normal rate determination assigns a different number of speech bits depending on the level of various speech metrics during the speech encoding process. To maintain the same frame duration regardless of the number of required bits to be sent requires different transmission rates and hence transmission power levels.

The maximum transmission rate requires more power than a lower transmission rate to achieve the same Eb/Nt (information bit energy to noise plus interference power spectral density) which maps to a specific probability of frame erasure rate. Hence, reducing the maximum transmission rate improves the probability of frame erasure given the same transmission power level. In many error interfaces there is extra coding gain such that if the transmit power for the lower rate signal frame is scaled by the ratio of the lower transmission rate to the maximum transmission rate, as is typically done, the probability of the mobile station correctly receiving the lower rate signal is still increased with the lower transmission power.

The maximum transmission rate requires more power than a lower transmission rate to achieve the same Eb/Nt (information bit energy to noise plus interference power spectral density), which maps to a specific probability of frame erasure rate. Hence, reducing the maximum transmission rate improves the probability of frame erasure given the same transmission power level.

If the sum of the two counters is greater than the second threshold, the BTS reduces (237) the maximum transmission rate with the option of maintaining the same maximum gain level. The process then ends (299).

Figure 3:
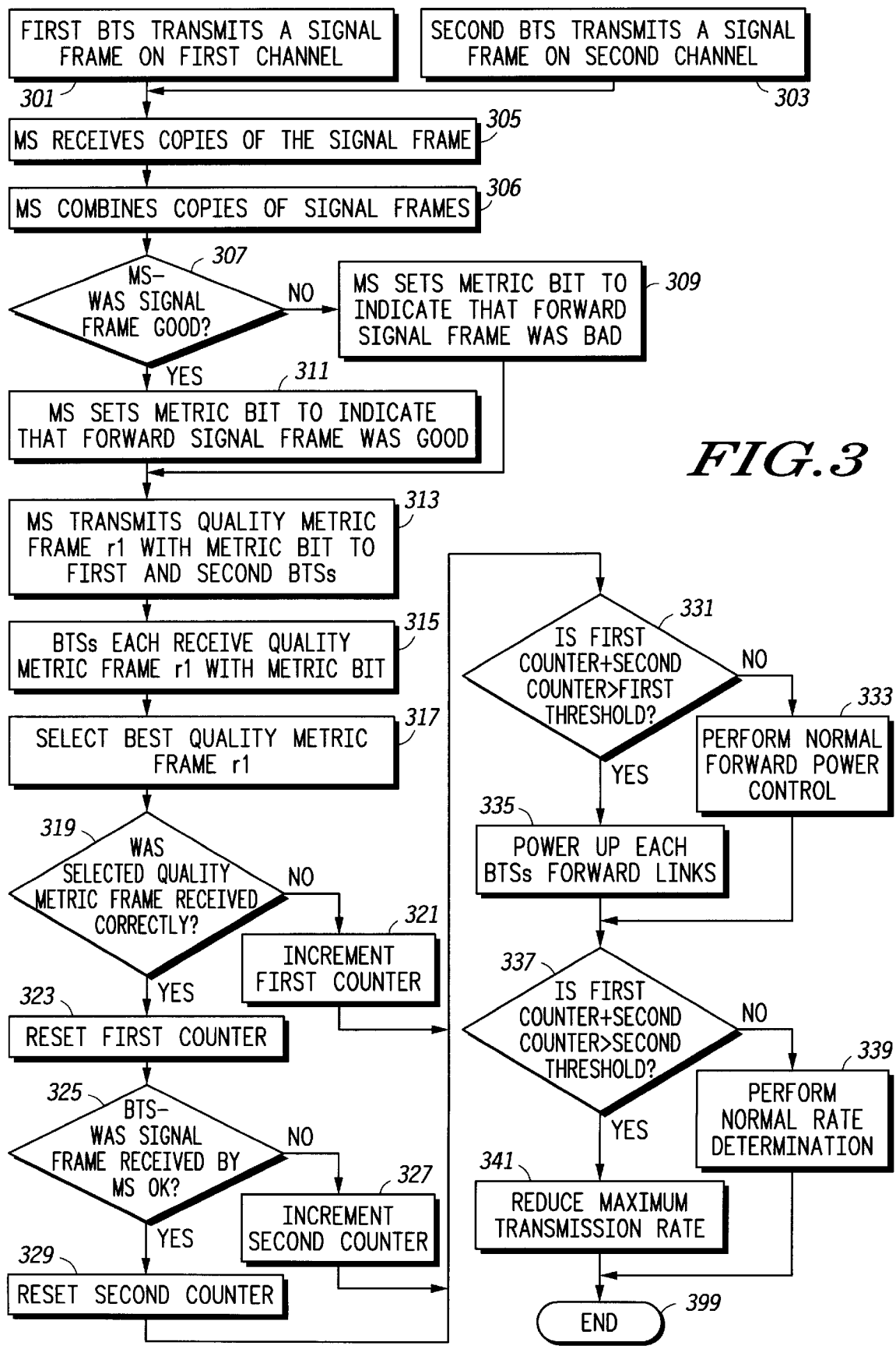
FIG. 3 depicts a flow diagram for updating forward power control when having multiple base transceiver stations transmitting a signal in accordance with the preferred embodiment of the present invention.

FIG. 3 depicts a flow diagram for updating forward power control when having multiple base transceiver stations transmitting a signal in accordance with the preferred embodiment of the present invention. FIG. 3 depicts a scenario where two base transceiver stations are transmitting a signal frame over a channel to a mobile station. One example of such a scenario is during the soft-handoff of a call, when a mobile station is transitioning from a first BTS, or set of BTSs, to a second BTS, or set of BTSs, for processing of the call.

FIG. 3 is described using the preferred method of processing for this embodiment, wherein the base transceiver stations perform the processing of the reverse signal frame sent from the mobile station. This processing could also be performed by the Centralized Base Station Controller (CBSC) associated with the base transceiver stations. This embodiment is well-suited for use in IS-95A, IS-95B, or J-ANSI-STD008 systems.

As depicted in FIG. 3, a first BTS transmits (301) a forward signal to a mobile station. A second BTS transmits (303) the forward signal, also to the mobile station. The signal frames transmitted by the first BTS and the second BTS are preferably the same signal frame. The mobile station receives (305) the two signals from the first BTS and the second BTS. Although only two base transceiver stations are shown in FIG. 3 for clarity, it should be understood that a plurality of base transceiver stations could be transmitting a signal frame for reception by the mobile station. After receiving the forward signal frame, the mobile station combines (306) the forward signals. The mobile station then determines (307) if the forward signal frame was good.

A signal frame is considered good if the computed CRC for the signal frame matched the transmitted CRC. More particularly, a signal frame is determined to be good if in general the forward error correction check field computed from the received frame information bits matches the check field sent in the transmitted frame. The transmission rate of the frame can be determined through a rate determination algorithm.

If the forward signal frame was not accurately received by the mobile station, the mobile station sets (309) a metric bit to indicate that the forward signal frame was not good. The metric bit is typically a bit in a frame that is sent to the base transceiver stations on a reverse link to indicate the status of the forward link. If the forward signal frame is determined to have been accurately received by the mobile station, the mobile station sets (311) the metric bit to indicate that the forward signal frame was accurately received by the mobile station.

The mobile station then transmits (313) a reverse signal frame that includes the metric bit to the base transceiver stations. Each BTS then receives (315) a copy of the reverse signal frame that includes the metric bit. In general, the forward and reverse channels will be composed of multiple signal paths, commonly referred to as multipath, where each signal path is separated by time delay and with each path being independently rayleigh faded.

Each BTS then preferably sends the copy of the reverse signal frame to a Centralized Base Station Controller (CBSC). In the preferred embodiment, the CBSC includes a transcoder. The base transceiver stations preferably communicate with the CBSC via a dedicated channel that is preferably circuit-switched. Alternately, the communication is on a packet network, such as Asynchronous Transfer Mode (ATM), or a frame relay system. Examples of frame or packet formats used in IS-95A, IS-95B, or J-ANSI-STD008 systems can be found in IS-634A.

The CBSC selects (317) the best quality frame from among the copies of the reverse signal frames received from the base transceiver stations. The CBSC then sends the best quality reverse frame to each of the base transceiver stations.

Each BTS then determines (319) whether the selected best quality frame with the metric bit was received correctly. If the reverse frame with the metric bit was not received correctly, the BTS increments (321) a first counter. If the reverse frame that included the metric bit was received correctly, the BTS resets (323) the first counter.

The BTS then determines (325) whether the forward signal frame sent from the base transceiver stations was accurately received by the mobile station. This is preferably accomplished by looking at the metric bit included in the reverse signal frame sent from the mobile station. Given that the reverse frame was received correctly and the forward signal frame was not properly received by the mobile station, as indicated by a predetermined value of the metric bit in the reverse signal frame, the BTS increments (327) a second counter. The first counter indicates how long the feedback information has been unavailable, and the second counter indicates how long it has been since the mobile station has received a good forward link frame. If the forward signal frame was correctly received by the mobile station, the BTS resets (329) the second counter.

In the preferred embodiment, the sum of the first and second counters is utilized by comparing with a first threshold. Alternately, a combined counter value, which is produced from a function of the first and second counters, can be compared to the first threshold. Once the first threshold has been exceeded, the BTS will power up the forward link transmissions by a predetermined amount to attempt to achieve a higher delivery rate of forward link messages.

In the preferred embodiment of the present invention, the first threshold is set to ten. Although the threshold may be set to any desired value, it is preferred to set the first threshold to a value between about 2 and 20. These values are selected to minimize the time the forward link is bad so as to avoid missing critical messaging needed to perform soft handoff. Further, these values reduce the period of bad voice quality, and in some cases to cause mobile to turn on, commonly referred to as keying, its transmitter if the mobile station has dekeyed its transmitter upon receiving a predetermined number of bad frames. For IS-95A/J-ANSI-STD008 systems a value of 10 has been found to be high enough that short problems with the signal do not lead to an unnecessary increase in transmit power of forward link signals, while not being too low to provide for dropped calls or other problems with communications or signal quality. If the power level is increased too quickly or to an excessive level, excess interference can be introduced into the system. This excess noise may lead to other signaling problems, which should be avoided.

The BTS then determines (331) whether the sum of the first counter and the second counter is greater than a first threshold. If the sum of the first and second counters does not exceed the first threshold, the BTS performs (333) normal forward power control. Normal forward power control in current second generation CDMA systems is characterized by reducing the forward (digital voltage) gain by "stepdown" units every "deltatime" frames until a metric bit, such as EIB in J-ANSI-STD008, or message, such as PMRM in IS-95 & J-ANSI-STD008, received at the BTSs indicates that a predetermined number of frames were erased at the mobile station.

At this point, the forward gain will be increased by some "step-up" units. In third generation CDMA systems, forward power control information is received every Kb milliseconds on a reverse link channel. This causes an increase or decrease in the forward link gains by e1 units. If the sum of the counters exceeds the first threshold, the BTS powers up (335) all forward links to the mobile station by a predetermined number of units. In the preferred embodiment, the forward link digital voltage gain is increased in proportion to the gain increase amount used in normal forward link power control, such as "step-up" units.

The BTS then determines (337) whether the sum of the first counter and the second counter exceeds a second threshold. The second threshold is larger than the first threshold and indicates a failure to improve the forward link. That is, if the counter sum reaches the second threshold value, the forward links obtaining the maximum gain level alone cannot fix the forward link. Consequently, the maximum transmission rate must be also reduced to improve the likelihood of a frame being correctly received. In the preferred embodiment, the threshold would be set to 20 and fall in the range of 3 to 30.

If the sum of the counters does not exceed the second threshold, the BTS performs (339) normal rate determination. Normal rate determination assigns a different number of speech bits depending on the level of various speech metrics during the speech encoding process. To maintain the same frame duration regardless of the number of required bits to be sent requires different transmission rates and hence transmission power levels. The maximum transmission rate requires more power than a lower transmission rate to achieve the same Eb/Nt (information bit energy to noise plus interference power spectral density) which maps to a specific probability of frame erasure rate. Hence, reducing the maximum transmission rate improves the probability of frame erasure given the same transmission power level.

If the sum of the counters does exceed the second threshold, the BTS reduces (341) the maximum transmission rate with the option of maintaining the same maximum gain level. The process then ends (399).

Figure 4:
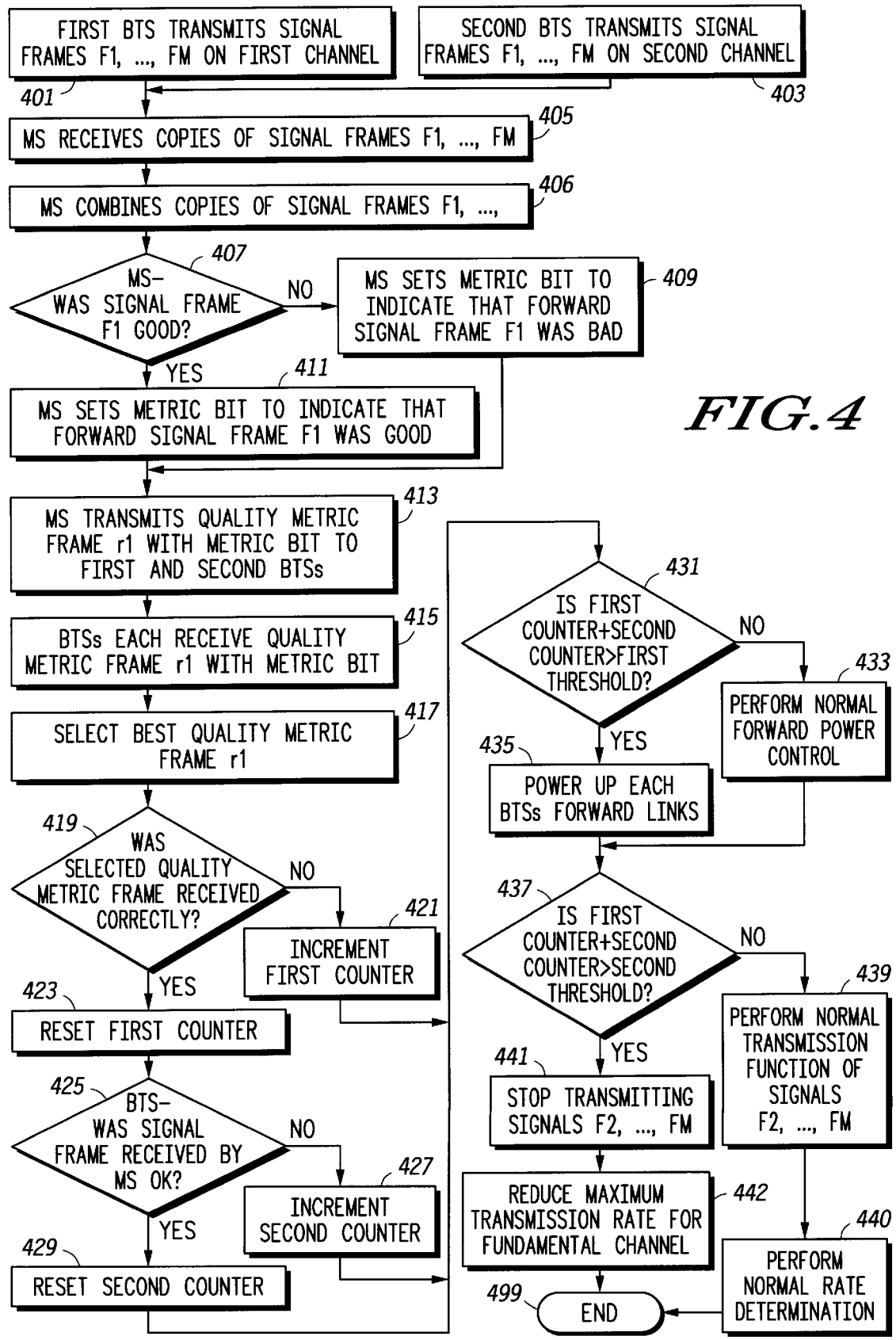
FIG. 4 depicts a flow diagram for updating forward power control when having multiple base transceiver stations transmitting a signal in accordance with an alternate embodiment of the present invention.

FIG. 4 depicts a flow diagram for updating forward power control when having multiple base transceiver stations transmitting a signal in accordance with an alternate embodiment of the present invention. FIG. 4 depicts a scenario where two base transceiver stations are each concurrently transmitting signal frames over a channel to a mobile station. It should be understood that more than two base transceiver stations can be transmitting a signal, but only two are shown in FIG. 4 for clarity.

The signal frame may include any combination of speech information, video information, or data. Typically, there is a fundamental and a supplemental signal frame sent over the same channel between a BTS and a mobile station. The fundamental channel includes speech information, video information, data, power control information, and signaling information. The supplemental channel preferably includes higher rate applications, such as video or high-speed data. FIG. 4 is described using the preferred method of processing for this embodiment, wherein the base transceiver stations perform the processing of the reverse signal frame sent from the mobile station. This processing could also be performed by the Centralized Base Station Controller (CBSC) associated with the base transceiver stations.

FIG. 4 is preferably practiced in an IS-95B type system or any system that includes two or more signal frames sent over the channel between the BTS and the mobile station. In IS-95B, there is a fundamental channel and up to seven supplemental channels that use unique Walsh codes to allow transmission on the same 1.25 MHz radio frequency channel.

As depicted in FIG. 4, a first BTS transmits (401) a forward signal to a mobile station. The forward signal may include many frames, including a fundamental channel and a plurality of supplemental channels. A second BTS transmits (403) the forward signal, also to the mobile station. The mobile station receives (405) the two signals from the first BTS and the second BTS. Although only two base transceiver stations are shown in FIG. 4 for clarity, it should be understood that a plurality of base transceiver stations could be transmitting a signal for reception by the mobile station. After receiving the forward signal, the mobile station combines (406) copies of the forward signals.

The mobile station then determines (407) if the forward signal frame sent on the fundamental channel and whether each forward signal frame sent on each supplemental channel was good. A forward signal frame is considered good if its computed CRC matches the transmitted CRC.

If the forward signal was not accurately received by the mobile station, the mobile station sets (409) a metric bit to indicate that the forward signal frame was bad. If the forward signal is determined to have been accurately received by the mobile station, the mobile station sets (411) the metric bit to indicate that the forward signal frame was accurately received by the mobile station. In IS-95B, only the reverse link fundamental signal frame would have the metric bit. The metric bit would only correspond to the received fundamental frame.

The mobile station then transmits (413) a reverse signal frame that includes the metric bit to the base transceiver stations. Each BTS receives (415) a copy of the reverse signal frame that includes the metric bit. Each BTS then sends the copy of the reverse signal frame to a Centralized Base Station Controller (CBSC). In the preferred embodiment, the CBSC includes a transcoder. The base transceiver stations preferably communicate with the CBSC via a dedicated circuit switch channel or by using a packet network, such as ATM, or a frame relay system. The CBSC selects (417) the best quality frame from among the copies of the reverse signal frames received from the base transceiver stations. The CBSC then sends the best quality reverse frame to the base transceiver stations.

Each BTS then determines (419) whether the selected best quality frame with the metric bit was received correctly. If the reverse frame with the metric bit was not received correctly, the BTS increments (421) a first counter. If the reverse frame that included the metric bit was received correctly, the BTS resets (423) the first counter. The BTS then determines (425) whether the forward frame sent from the base transceiver stations was accurately received by the mobile station. This is preferably accomplished by looking at the metric bit included in the reverse signal frame sent from the mobile station.

If the reverse frame was received correctly and the forward signal frame was not properly received by the mobile station, as indicated by a predetermined value of the metric bit in the reverse signal frame, the BTS increments (427) a second counter. The first counter indicates how long the feedback information has been unavailable, and the second counter indicates ho long it has been since the mobile station has received a good forward link signal frame. The forward link signal frame is on a fundamental channel in IS-95B systems. If the forward signal frame was correctly received by the mobile station, the BTS resets (429) the second counter.

In the preferred embodiment, the sum of the first and second counters is utilized by comparing with a first threshold. Alternately, a function of one or both counters can be compared to the first threshold. Once the first threshold has been exceeded, the BTS will power up the forward link transmissions by a predetermined amount to try to achieve a higher delivery rate of forward link messages and improve voice and data quality.

In the preferred embodiment of the present invention, the first threshold is set to ten. Although the threshold may be set to any desired value, it is preferred to set the first threshold to a value between about 2 and 20. The value is selected to minimize the time the forward link is bad so as to avoid missing critical messaging needed to perform soft handoff, reduce the period of bad voice quality, and in some cases to cause mobile to key its transmitter if it has dekeyed it upon receiving a predetermined number of bad frames. For IS-95A/J-ANSI-STD008 systems, a value of 10 has been found to be high enough that short problems with the signal do not lead to an unnecessary increase in transmit power of forward link signals, while not being too low to provide for dropped calls or other problems with communications or signal quality. If the power level is increased too quickly or to an excessive level, excess interference can be introduced into the system. This excess noise may lead to other signaling problems, which should be avoided.

The BTS then determines (431) whether the sum of the first counter and the second counter is greater than a first threshold. If the sum of the first and second counters does not exceed the first threshold, the BTS performs (433) normal forward power control. In second generation CDMA systems, forward power control is characterized by reducing the forward gain by "stepdown" units every "deltatime" frames until a metric bit or message received at the BTSs indicates that Ka frames were erased at the mobile station. At this point, the forward gain will be increased by some "step-up" units.

In third generation CDMA systems, forward power control information is received every Kb ms on a reverse link channel which causes an increase or decrease in the forward link gains by e1 units. If the sum of the counters does exceed the first threshold, the BTS powers up (435) all forward links to the mobile station by a predetermined number of units. In the preferred embodiment, the forward link digital voltage gain is increased in proportion to the gain increase amount used in normal forward link power control.

The BTS then determines (437) whether the sum of the first counter and the second counter exceeds a second threshold. The second threshold is larger than the first threshold and indicates failure to improve the fundamental channel's forward link. If the sum of the counters does not exceed the second threshold, the BTS performs (439) normal transmission function of signals. Normal transmission function of the signals entails having a power control function based on power control information obtained preferably on the reverse fundamental channel for the other present forward channels, such as supplemental channels, a dedicated control channel, or a fundamental channel. The supplemental forward link gains will preferably be scaled in proportion to the fundamental channel's forward link gain. The BTS then performs (440) normal rate determination, as in the description relating to FIG. 3.

If the sum of the counters does exceed the second threshold, the BTS reduces (441), up to zero, the transmission rate of the signals on the supplemental channels. The BTS then reduces (442) the maximum transmission rate for the fundamental channel with the option of maintaining the same maximum gain level, just as in the embodiment described in FIG. 3. The process then ends (499).

Figure 5:
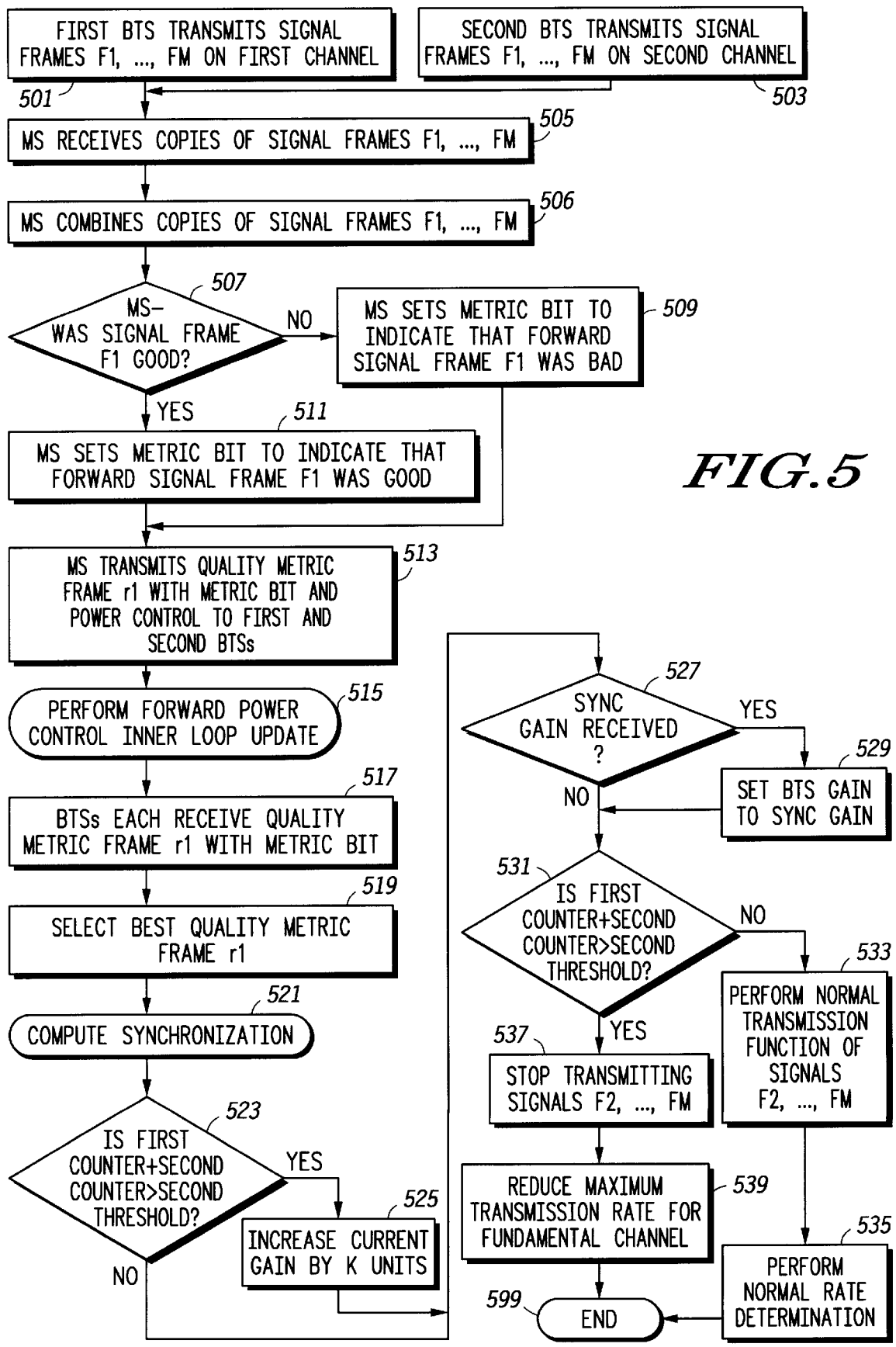
FIG. 5 depicts a flow diagram for updating forward power control in accordance with a further alternate embodiment of the present invention.

FIG. 5 depicts a flow diagram for updating forward power control in accordance with a further alternate embodiment of the present invention. FIG. 5 depicts a scenario where two base transceiver stations are each concurrently transmitting signal frames over a channel to a mobile station. It should be understood that more than two base transceiver stations can be transmitting a signal, but only two are shown in FIG. 5 for clarity. The signal frame may include a combination of speech information, video information, or data to be sent over the air.

Typically, there is a fundamental and a supplemental signal frame sent over the same channel between a BTS and a mobile station. The fundamental channel includes speech information, video information, data, power control information, and signaling information. The supplemental channel preferably includes higher rate applications, such as video or high-speed data. FIG. 5 is described using the preferred method of processing for this embodiment, wherein the base transceiver stations perform the processing of the reverse signal frame sent from the mobile station. This processing could also be performed by the Centralized Base Station Controller (CBSC) associated with the base transceiver stations. FIG. 5 is preferably practiced in a third generation CDMA system or any system that can utilize fast forward power control.

As depicted in FIG. 5, a first BTS transmits (501) a forward signal to a mobile station. The forward signal may include many frames, including a fundamental channel, a plurality of supplemental channels, and a dedicated control channel. A second BTS transmits (503) the forward signal, also to the mobile station. The mobile station receives (505) the two signals from the first BTS and the second BTS. Although only two base transceiver stations are shown in FIG. 5 for clarity, it should be understood that a plurality of base transceiver stations could be transmitting a signal for reception by the mobile station. After receiving the forward signal, the mobile station combines (506) copies of the forward signals.

The mobile station then determines (507) if the forward signal frame sent on the fundamental channel and whether each forward signal frame sent on each supplemental channel was good. A forward signal frame is considered good if its computed CRC matches the transmitted CRC and its transmitted rate can be determined.

If the forward signal was not accurately received by the mobile station, the mobile station sets (509) a metric bit to indicate that the forward signal frame was bad. If the forward signal is determined to have been accurately received by the mobile station, the mobile station sets (511) the metric bit to indicate that the forward signal frame was accurately received by the mobile station.

The mobile station then transmits (513) a reverse signal frame that includes the metric bit to the base transceiver stations.

Figure 6:
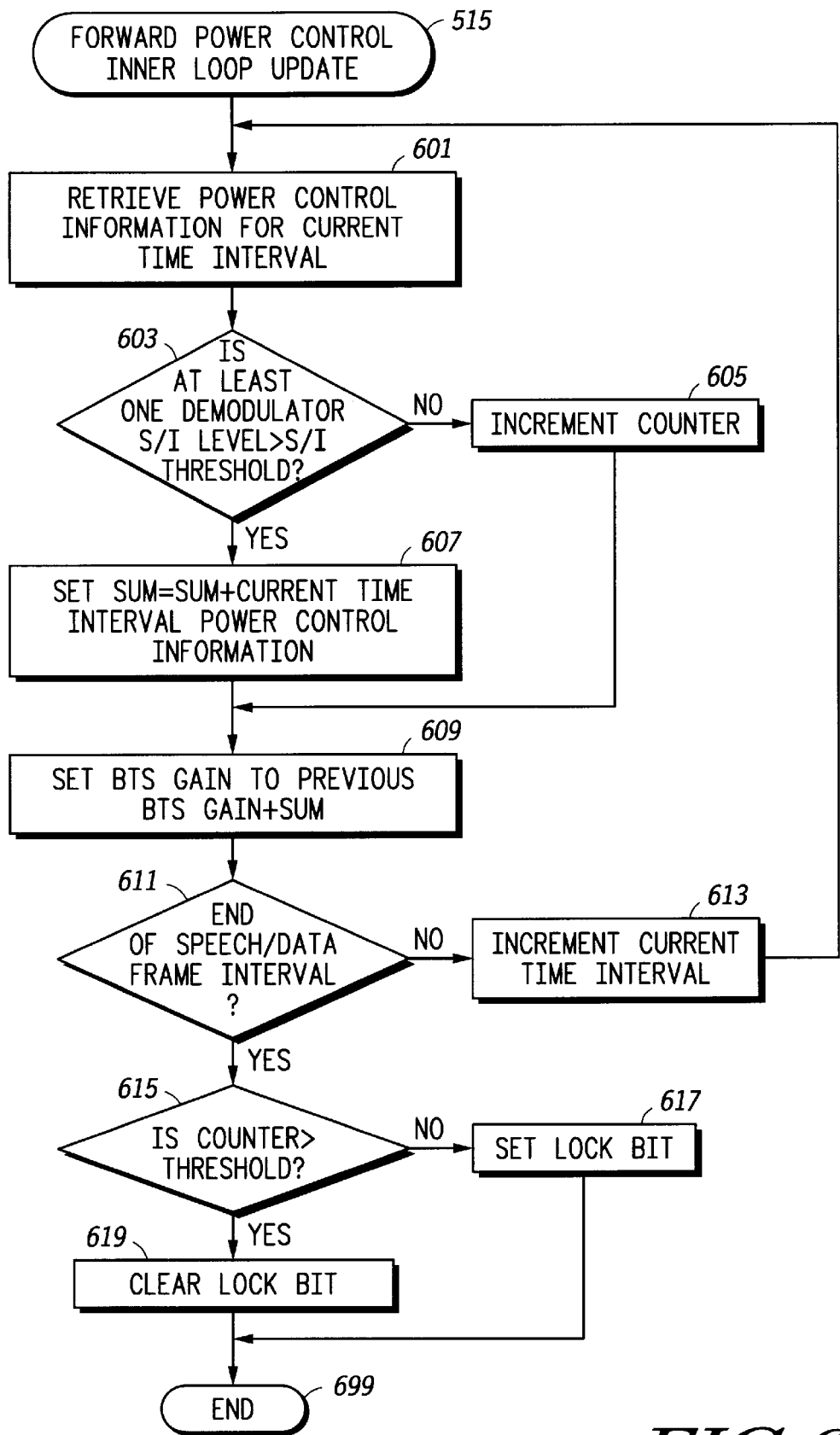
FIG. 6 depicts a flow diagram for forward power control inner loop updating in accordance with the further alternate embodiment of the present invention.

Each BTS then performs (515) forward power control inner loop update, as depicted in FIG. 6. The power control inner loop (PCIL) update time interval is typically 1.25 ms or less. Each BTS retrieves (601) the power control information for the current PCIL time interval. The BTS then determines (603) whether there is at least one demodulator signal-to-interference (S/I) level that is greater than a signal to interference threshold. This S/I level can be based on the reverse signal frame or a separate pilot signal which could be punctured in the reverse signal frame or be a separate channel.

If there is no level greater then the S/I threshold, the BTS increments (605) a counter. If the level is above the threshold, the BTS adds (607) to the sum representing the addition of the power up or power down updates in terms of digital voltage gain since the beginning of the current frame by the next power control update for this PCIL time interval.

The BTS gain is then set (609) to the old BTS gain, corresponding to the previous frame interval, plus the sum value. This gain is used for the forward link over the next PCIL update time interval, typically 1.25 ms. The BTS then determines (611) whether it has reached the end of the speech/data frame interval, typically 20 ms. If not, the BTS increments (613) the current time interval, and restarts the process by getting (601) power control information for the current time interval, typically 1.25 ms.

If this is the end of the frame interval, the BTS then determines (615) whether the counter is greater than a threshold. If the counter is not greater than the threshold, the BTS sets (617) a lock bit. If the counter is greater than the threshold, the BTS clears (619) the lock bit. The lock bit is used to indicate whether at least one of the demodulator rake fingers has been effectively locked during the time interval. If any demodulator has been effectively locked, the lock bit is set. If no demodulator finger has effectively locked, the lock bit is cleared. The forward power control inner loop update then ends (699).

Figure 7:
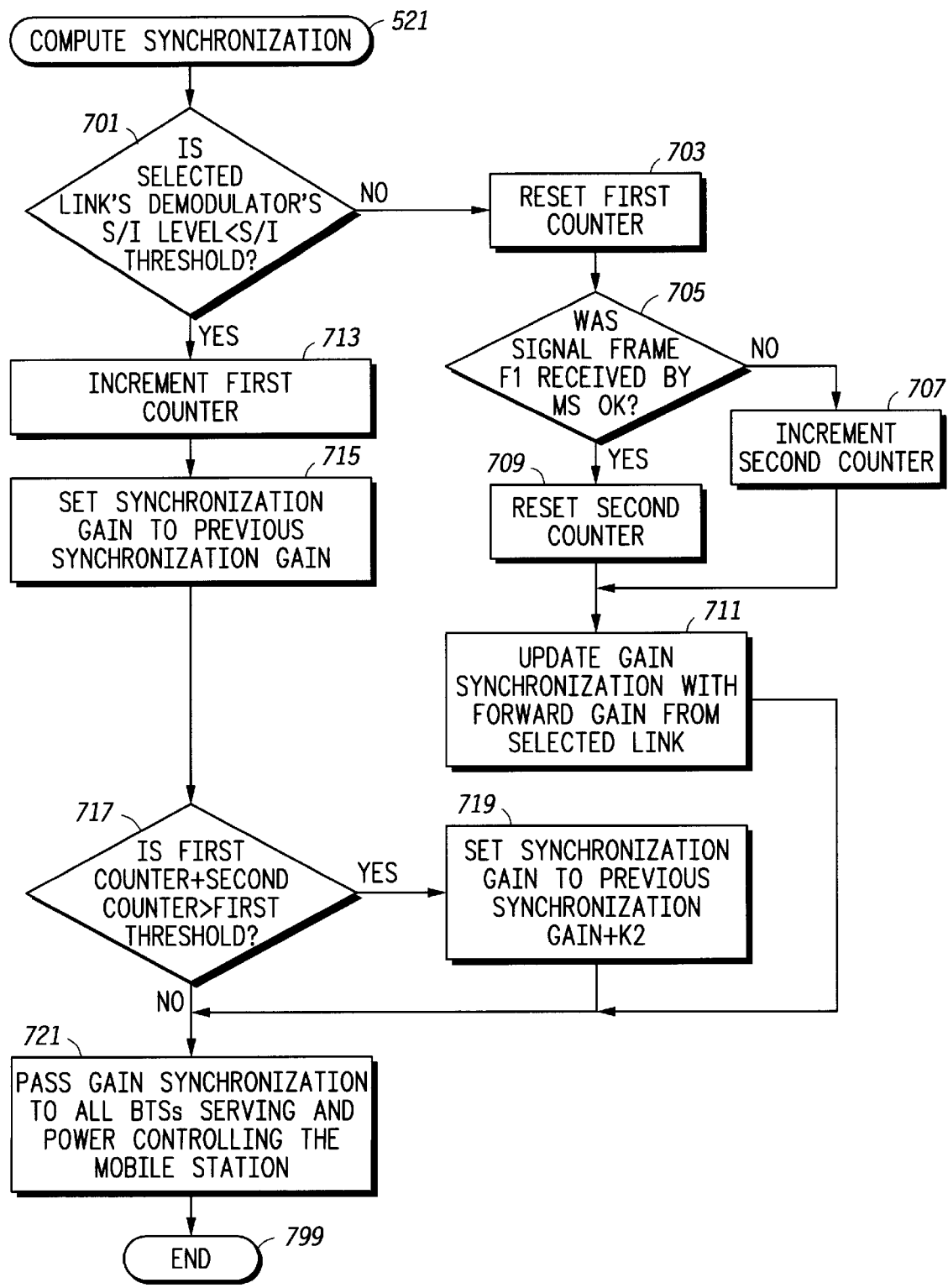
FIG. 7 depicts a flow diagram for computing synchronization in accordance with the further alternate embodiment of the present invention.

Returning now to FIG. 5, each BTS has finished receiving (517) and demodulating a copy of the reverse signal (OTA) frame that includes the metric bit. The lock bit from each BTS is passed to the CBSC along with the current BTS's forward link gain (BTS gain), current reverse link OTA demodulated information, and current reverse link OTA frames quality and transmission rate. The best quality metric frame is then selected (519). The CBSC then computes (521) synchronization, as depicted in FIG. 7.

The CBSC determines (701) whether the selected link's demodulator's signal to interference (S/I) level is less than a threshold by looking at the lockbit of the selected link. The selected link corresponds to the BTS with the best quality reverse link frame and is based on the OTA frame quality and transmission rate information. If the selected lockbit is set, meaning that the S/I level of at least one demodulator of the selected BTS was above the threshold, the CBSC resets (703) the first counter.

The CBSC then determines (705) whether the signal frame f1 was received by the mobile station properly. If not, the CBSC increments (707) a second counter. If the signal frame was received properly by the mobile station, the CBSC resets (709) the second counter. After incrementing or resetting the second counter, the CBSC updates (711) the synchronization gain as the sum of its current value plus a value determined from function of the forward gain from the selected link and the previous forward gain from the previous selected link. In the preferred embodiment, the synchronization gain is set to its current value plus the difference of the current selected forward link gain and the previous selected forward link gain.

If the selected link's lockbit is clear, meaning that the strongest demodulator's S/I level belonging to the selected BTS is less than the S/I threshold, the CBSC increments (713) the first counter. The CBSC then sets (715) the synchronization gain to the previous level of the synchronization gain. The CBSC then determines (717) whether the a function of the first counter and the second counter is greater than a first threshold. If so, the CBSC sets (719) the synchronization gain to the previous synchronization gain plus a predetermined number of units (k2) to try to achieve a higher delivery rate of forward link messages and improve voice/data quality. In the preferred embodiment, k2 is some constant value in the range from 1 to 20 digital gain units.

The CBSC then passes (721) the synchronization gain to all BTSs serving and power controlling the mobile station. In this manner, all BTSs that are in communication with the mobile station will have the same synchronization gain. The process then ends (799). Note that if the selected BTS lockbit and all the BTS gains had been passed down to each BTS, the synchronization function could have been performed locally at the BTSs. This would require the information to passed down every frame. By doing the synchronization function at the CBSC, it is possible to pass down the synchronization gain less frequency, such as every R frames, where R is greater than or equal to 1.

Returning now to FIG. 5, each BTS then updates a first and second counter, as done in FIG. 4. Each BTS then determines (523) whether the sum of the first counter and the second counter is greater than a first threshold. If the sum of the first and second counters is greater than the first threshold, the BTS increases (525) the current gain by a predetermined number of units (k) to try to achieve a higher delivery rate of forward link messages and improve voice/data quality. In the referred embodiment, k is some constant value in the range from 1 to 20 digital gain units.

The BTS then determines (527) whether the synchronization gain has been received. If the synchronization gain has been received, the BTS sets (529) the BTS gain to the synchronization gain. This causes all serving BTS forward links to have the same gain and corrects for power control information errors during transmission on the reverse feedback links. In practice it has been found that keeping the same TCH forward link gain to pilot signal gain on all active forward links is the best strategy due to demodulator (rake finger) combining strategies used and the fact that diversity roll-off is relatively insensitive to signal path imbalances up to 6 dB.

The BTS then determines (531) whether the sum of the first counter and the second counter exceeds a second threshold. The second threshold is larger than the first threshold and indicates failure to improve the fundamental channel's forward link. If the sum of the counters does not exceed the second threshold, the BTS performs (533) normal transmission function of signals. Normal transmission function of the signals entails having a power control function based on the power control information obtained on the fundamental channel for the supplemental channels. The supplemental forward link gains will preferably be scaled in proportion to the fundamental channel's forward link gain. The BTS then performs (535) normal rate determination, as in the description relating to FIG. 3.

If the sum of the counters does exceed the second threshold, the BTS stops transmitting (537) the signals on the supplemental channels. The BTS then reduces (539) the maximum transmission rate for the fundamental channel with the option of maintaining the same maximum gain level, just as in the embodiment described in FIG. 3. The process then ends (599).

Figure 8:
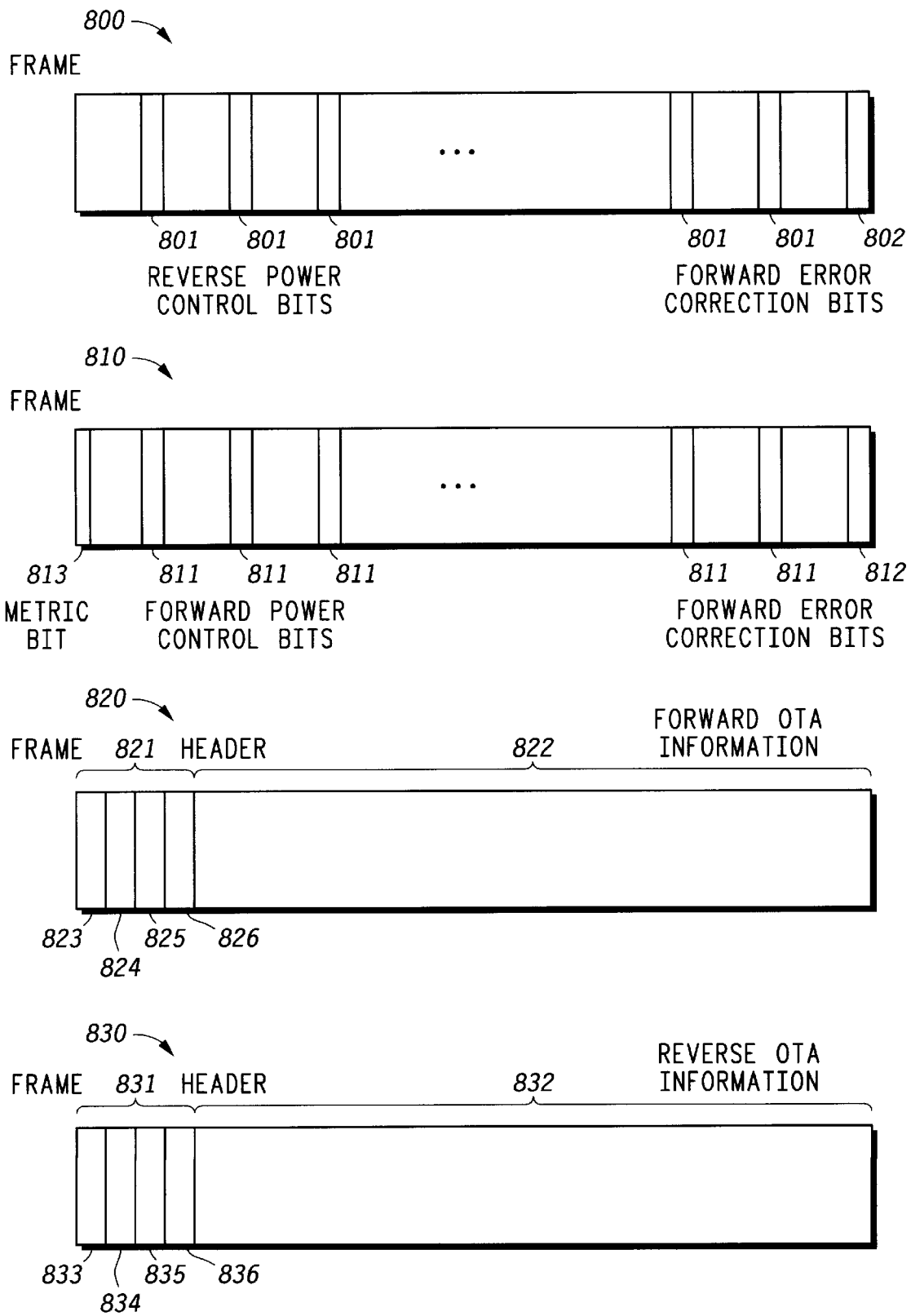
FIG. 8 depicts a plurality of signal frames in accordance with the preferred embodiment of the present invention.

FIG. 8 depicts a plurality of signal frames in accordance with the preferred embodiment of the present invention. Frames 800 and 810 depict over the air (OTA) frames that are transmitted by radio frequency (RF) over the air between a base transceiver station and a mobile station. Frames 820 and 830 depicts frames that are communicated between a CBSC and a BTS. Frames 820 and 830 could also represent packet that are transmitted between a CBSC and a BTS.

Frame 800 represents a forward link traffic channel frame. Frame 800 also represents a fundamental frame used in third generation CDMA systems or the like that include both fundamental and supplemental channels. Frame 800 includes a plurality of Reverse Power Control (RPC) bits 801. In the preferred embodiment, RPC updates are bits 801 that are punctured into frame 800 at regular intervals. The RPC updates could also be sent on a separate forward link channel that is not the fundamental (TCH) or supplemental channel. RPC bits 801 represent power level increases or decreases and are typically integrated at the mobile to update its transmit power level. In IS-95 systems, a power control update is a single power control bit (PCB) which is set to either 0 or 1. Frame 800 also includes Forward Error Correction (FEC) bits 802 such as a CRC commonly known to those skilled in the art.

Frame 810 represents a reverse link traffic channel frame. Frame 810 also represents a fundamental frame used in third generation CDMA systems or the like that include both fundamental and supplemental channels. Frame 810 includes a plurality of Forward Power Control (FPC) bits 811. In the preferred embodiment, FPC updates are bits 811 that are punctured into frame 810 at regular intervals. The FPC updates could also be sent on a separate reverse link channel. FPC bits 811 represent power level increases or decreases and are typically integrated at the BTS to update the forward link transmit power levels corresponding to the mobile station. Typically a power control update is a single power control bit (PCB) which is set to either 0 or 1.

Frame 810 also includes Forward Error Correction (FEC) bits 812. Frame 810 also includes a metric bit 813. Metric bit 813 is used to communicate the status of a metric to the BTS. One example of a metric bit is an Erasure Indicator Bit (EIB) as defined in J-ANSI-STD008.

Frames 820 and 830 depict frames that are transmitted between a CBSC and a BTS. Frame 820 depicts a CBSC to BTS voice or data frame. Frame 820 includes a header portion 821 and a forward OTA information portion 822. Header 821 includes information used to process frame 820 for transmission over the air by each BTS. Header 821 includes a selected reverse OTA quality field 823, a gain synchronization field 824, a selected lockbit field 825, and a selected metric bit 826.

The selected reverse frames OTA quality and rate field 823 represents the frame quality and the transmission rate for the selected frame. Field 823 may include CRC, Symbol Error Rate (SER), some other decoder quality metric, or rate information. Gain synchronization field 824 includes gain information that allows each BTS to have a synchronized gain or it can be the previous gains used for each BTS forward link.

Lockbit field 825 indicates whether at least one of the selected links demodulators at the BTS were locked over the previous selected reverse link frame. Metric bit 826 taken from the selected reverse link frame includes information relating to whether an erasure or bad forward link frame indicator is present. One example of a metric bit is an Erasure Indicator Bit (EIB).

Frame 830 depicts a BTS to CBSC voice or data frame. Frame 830 includes a header portion 831 and a reverse OTA portion 832. Header 831 includes information used to process frame 830. Header 831 includes a reverse OTA quality and rate field 833, a metric bit 834, a BTS gain field 835, and a lockbit field 836.

Reverse OTA quality and rate field 833 represents the frame quality and the transmission rate for the frame. Field 833 may include CRC, Symbol Error Rate (SER), some other decoder quality metric, or rate information. Metric bit 834 includes information relating to whether an erasure or bad forward link frame indicator is present. One example of a metric bit is an Erasure Indicator Bit (EIB). BTS gain field 835 includes information relating to the current forward link gain from the BTS.

Lockbit field 836 indicates whether at least one of the BTS's demodulators rake fingers had a signal-to-interference (S/I) ratio above a threshold for a predetermined number of power control interloop (PCIL) time intervals. If the S/I ratio of all the demodulators was below the threshold for the predetermined number of intervals, lockbit field 836 is cleared. If the S/I ratio of at least one demodulator was above the threshold for the predetermined number of intervals, lockbit field 836 is set.

Thus, the present invention provides a method for updating forward power control in a communication system. The present invention provides a method for performing forward power control when the feedback link is temporarily missing. The present invention also provides a method for updating forward power control when the power control information received on the feedback link can not be determined.

By incrementing counters when the forward link and the reverse link do not accurately transmit signal frames, the present invention is able to compare the counters, either individually or combined, to determine what method of forward power control should be implemented. The present invention allows for normal power control when the counters are below a first threshold, while powering up the forward link when the sum of the counters is above the first threshold. By setting the threshold to an appropriate value, unnecessary powering up of the forward link is avoided.

In addition, by utilizing a second threshold that is preferably greater than the first threshold, the present invention allows for flexibility in forward power control. When the sum of the counters is below the second threshold, the present invention performs normal rate determination. When the sum is greater than the second threshold, the present invention reduces the maximum transmission rate. This improves the probability of the mobile station correctly receiving the forward signal even if the transmit power for the lower rate frame is scaled by the ratio of the lower transmission rate to the maximum transmission rate. This is due to extra coding gain and reduces the amount of interference present when a signal is still not being accurately received by lowering the maximum transmission rate and corresponding power. The reduced interference leads to more accurate reception of signals in the communication system.

The present invention also allows for forward power control in scenarios when a mobile station is in communication with a plurality of base transceiver stations. One example of such a scenario is during soft handoff, when a mobile unit is transferring processing of an ongoing call from one BTS to another.

Further, the present invention provides for further improving in forward power control by providing an ability to cease transmitting signals on supplemental channels when the sum of the counters exceeds a threshold value. By temporarily stopping transmission of the signals on the supplemental channels, the BTS reduces interference on the fundamental channel and consequently provides an increased probability that the signal on the fundamental channel will be accurately received. Such supplemental channels are available, for example, in third generation CDMA systems.

While this invention has been described in terms of certain examples thereof, it is not intended that it be limited to the above description, but rather only to the extent set forth in the claims that follow.

We claim:

1. A method for updating power control in a communication system, the method comprising the steps of:

transmitting a signal frame from a base transceiver station;

receiving the signal frame at a mobile station in communication with the base transceiver station;

determining, at the mobile station, whether the signal frame was accurately received;

setting a metric bit in a quality metric at the mobile station, the metric bit indicating whether the signal frame was received correctly by the mobile station;

transmitting the quality metric by the mobile station;

receiving the quality metric by the base transceiver station;

determining whether to update power control, based at least in part upon the quality metric;

determining whether the quality metric was received properly by the base transceiver station; and incrementing, when the quality metric was not properly received by the base transceiver station, a first counter at the base transceiver station.

2. The method for updating power control in accordance with claim 1, further comprising the step of resetting, when the quality metric was properly received by the base transceiver station, the first counter.

3. The method for updating power control in accordance with claim 2, further comprising the step of determining whether the signal frame was received properly by the mobile station.

4. The method for updating power control in accordance with claim 3, further comprising the step of incrementing, when the signal frame was not properly received by the mobile station, a second counter at the base transceiver station.

5. The method for updating power control in accordance with claim 4, further comprising the step of resetting, when the signal frame was properly received by the mobile station, the second counter.

6. The method for updating power control in accordance with claim 5, further comprising the step of producing a combined counter value from a function of the first counter and the second counter.

7. The method for updating power control in accordance with claim 5, further comprising the step of summing the first counter and the second counter to produce a summed counter value.

8. The method for updating power control in accordance with claim 6, further comprising the step of comparing the combined counter value to a first threshold.

9. The method for updating power control in accordance with claim 8, further comprising the step of performing, if the combined counter value does not exceed the first threshold, normal forward power control at the base transceiver station.

10. The method for updating power control in accordance with claim 9, further comprising the step of powering up, if the combined counter value exceeds the first threshold, a forward link at the base transceiver station by a predetermined value.

11. The method for updating power control in accordance with claim 10, further comprising the step of comparing the combined counter value to a second threshold.

12. The method for updating power control in accordance with claim 11, further comprising the step of performing, if the combined counter value does not exceed the second threshold, normal rate determination at the base transceiver station.

13. The method for updating power control in accordance with claim 12, further comprising the step of reducing, if the combined counter value exceeds the second threshold, a maximum transmission rate at the base transceiver station.

14. A method for updating power control in a communication system, the method comprising the steps of:

transmitting a first signal frame from a first base transceiver station;

transmitting a second signal frame from a second base transceiver station;

receiving the first signal frame and the second signal frame at a mobile station in communication with the first base transceiver station and the second base transceiver station;

combining the first signal frame and the second signal frame to produce a combined signal frame;

determining, at the mobile station, whether the combined signal frame was accurately received;

setting a metric bit in a quality metric at the mobile station, the metric bit indicating whether the combined signal frame was received correctly by the mobile station;

transmitting the quality metric by the mobile station;

receiving the quality metric by the first base transceiver station;

receiving the quality metric by the second base transceiver station;

selecting a best quality metric from the quality metric received by the first base transceiver station and the quality metric received by the second base transceiver station;

determining whether to update power control, based at least in part upon the best quality metric;

determining whether the quality metric was received properly by the first base transceiver station.

15. The method for updating power control in accordance with claim 14, wherein the step of transmitting the second signal frame from the second base transceiver station comprises the step of transmitting the second signal frame that is a copy of the first signal frame.

16. The method for updating power control in accordance with claim 14, further comprising the step of incrementing, when the quality metric was not properly received by the first base transceiver station, a first counter at the first base transceiver station.

17. The method for updating power control in accordance with claim 16, further comprising the step of resetting, when the quality metric was properly received by the first base transceiver station, the first counter.

18. The method for updating power control in accordance with claim 17, further comprising the step of determining whether a forward signal frame was received properly by the mobile station.

19. The method for updating power control in accordance with claim 18, further comprising the step of incrementing, when the forward signal frame was not properly received by the mobile station, a second counter at the first base transceiver station.

20. The method for updating power control in accordance with claim 19, further comprising the step of resetting, when the forward signal frame was properly received by the mobile station, the second counter.

21. The method for updating power control in accordance with claim 20, further comprising the step of producing a combined counter value from a function of the first counter and the second counter.

22. The method for updating power control in accordance with claim 20, further comprising the step of summing the first counter and the second counter to produce a combined counter value.

23. The method for updating power control in accordance with claim 22, further comprising the step of comparing the combined counter value to a first threshold.

24. The method for updating power control in accordance with claim 23, further comprising the step of performing, if the combined counter value does not exceed the first threshold, normal forward power control at the first base transceiver station.

25. The method for updating power control in accordance with claim 23, further comprising the step of performing, if the combined counter value does not exceed the first threshold, normal forward power control at the second base transceiver station.

26. The method for updating power control in accordance with claim 24, further comprising the step of powering up, if the combined counter value exceeds the first threshold, a forward link at the first base transceiver station by a predetermined value.

27. The method for updating power control in accordance with claim 25, further comprising the step of powering up, if the combined counter value exceeds the first threshold, a forward link at the second base transceiver station by a predetermined value.

28. The method for updating power control in accordance with claim 27, further comprising the step of comparing the combined counter value to a second threshold.

29. The method for updating power control in accordance with claim 28, further comprising the step of performing, if the combined counter value does not exceed the second threshold, normal rate determination at the first base transceiver station.

30. The method for updating power control in accordance with claim 29, further comprising the step of reducing, if the combined counter value exceeds the second threshold, a maximum transmission rate at the first base transceiver station.

31. A method for updating power control at a base transceiver station in a communication system, the communication system including a transcoder in communication with a first base transceiver station and a second base transceiver station, the communication system further including a plurality of mobile units, the method comprising the steps of:

transmitting a plurality of first signal frames from a first base transceiver station, the plurality of first signal frames including a first fundamental channel and at least one first supplemental channel;

transmitting a plurality of second signal frames from a second base transceiver station, the plurality of second signal frames including a second fundamental channel and at least one second supplemental channel;

receiving the plurality of first signal frames and the plurality of second signal frames at one of said mobile units in communication with the first base transceiver station and the second base transceiver station;

combining the plurality of first signal frames and the plurality of second signal frames to produce a combined signal frame;

determining, at the mobile unit, whether the combined signal frame was accurately received;

setting a metric bit in a quality metric at the mobile unit, the metric bit indicating whether the combined signal frame was received correctly by the mobile unit;

transmitting the quality metric by the mobile unit;

receiving the quality metric by the first base transceiver station;

receiving the quality metric by the second base transceiver station;

selecting, at the transcoder, a best quality metric from the quality metric received by the first base transceiver station and the quality metric received by the second base transceiver station; and determining whether to update power control, based at least in part upon the best quality metric.

32. The method for updating power control in accordance with claim 31, further comprising the step of performing normal transmission of the plurality of first signal frames at the first base transceiver station.

33. The method for updating power control in accordance with claim 31, further comprising the step of performing normal transmission of the plurality of second signal frames at the second base transceiver station.

34. The method for updating power control in accordance with claim 31, further comprising the step of ceasing transmission of the at least one first supplemental channel at the first base transceiver station.

35. The method for updating power control in accordance with claim 31, further comprising the step of ceasing transmission of the at least one second supplemental channel at the second base transceiver station.

* * * * *